(12) United States Patent
Weigelt et al.

(10) Patent No.: US 7,263,496 B1
(45) Date of Patent: Aug. 28, 2007

(54) GENERIC REVENUE MANAGEMENT DATA MODEL FOR REVENUE MANAGEMENT

(75) Inventors: Mikael O. Weigelt, Louisville, CO (US); Marc Paige, Houston, TX (US)

(73) Assignee: Pros Revenue Management, Inc., Houston, TX (US)

( * ) Notice: Subject to any disclaimer, the term of this patent is extended or adjusted under 35 U.S.C. 154(b) by 1056 days.

(21) Appl. No.: 09/975,226

(22) Filed: Oct. 11, 2001

Related U.S. Application Data

(60) Provisional application No. 60/239,448, filed on Oct. 11, 2000.

(51) Int. Cl.
*G06F 17/30* (2006.01)
(52) U.S. Cl. .............................. 705/10; 705/7
(58) Field of Classification Search ............... 705/7, 705/10
See application file for complete search history.

(56) References Cited

U.S. PATENT DOCUMENTS

| | | | | |
|---|---|---|---|---|
| 5,255,184 A | * | 10/1993 | Hornick et al. | 705/6 |
| 5,652,867 A | * | 7/1997 | Barlow et al. | 703/6 |
| 5,918,209 A | * | 6/1999 | Campbell et al. | 705/5 |
| 6,263,315 B1 | * | 7/2001 | Talluri | 705/8 |
| 6,336,097 B1 | * | 1/2002 | Scipioni | 705/6 |
| 6,721,714 B1 | * | 4/2004 | Baiada et al. | 705/7 |
| 6,826,538 B1 | * | 11/2004 | Kalyan et al. | 705/7 |
| 2002/0055865 A1 | * | 5/2002 | Hammann | 705/7 |
| 2002/0065699 A1 | * | 5/2002 | Talluri | 705/8 |
| 2002/0072999 A1 | * | 6/2002 | Andres et al. | 705/28 |
| 2002/0120492 A1 | * | 8/2002 | Phillips et al. | 705/10 |
| 2002/0133382 A1 | * | 9/2002 | DeMarcken et al. | 705/5 |
| 2002/0161610 A1 | * | 10/2002 | Walker et al. | 705/5 |
| 2002/0178034 A1 | * | 11/2002 | Gardner et al. | 705/5 |
| 2003/0208436 A1 | * | 11/2003 | Boyle et al. | 705/37 |

FOREIGN PATENT DOCUMENTS

WO    WO9725684 A1 * 7/1997

OTHER PUBLICATIONS

Revenue Management: Research Overview and Prospects by Jeffrey McGill et al, Institute for Operations Research and the Management Sciences, May 1999, vol. 33, No. 2, pp. 233-256.*
Forecasting for airline revenue management by Hossam Zaki, The Journal of Business Forecasting Methods & Systems, Spring 2000, vol. 19, issue 1, p. 2.*

(Continued)

*Primary Examiner*—Romain Jeanty
(74) *Attorney, Agent, or Firm*—Sprinkle IP Law Group (57) ABSTRACT

A generic revenue management data model is provided for expressing revenue management problems. The generic revenue management data model includes a first data structure containing a representation of a set of network demands, a second data structure containing a representation of a set of network resources, a third data structure containing a representation of a set of resource bundles and a fourth data structure containing a representation of a set of resource bundle to demand links. The generic revenue management data model can also include a fifth data structure containing a representation of a set of resource demands.

24 Claims, 3 Drawing Sheets

OTHER PUBLICATIONS

Talus Solutions, Inc Announces Application Service Provider Strategy to Expand Its Pricing and Revenue Management Solutions, Business Editors, Business Wire (New York), Mar. 13, 2000, p. 1.*

Talus Solutions, Inc Launches Talus Solutions Revenue Management Suite to SErve E-Business MArketplace, Business Editors, Business Wire (New York), Feb. 8, 2000, p. 1.*

"Descartes Offers Breakthrough Revenue Management and CRM Capabilities for Consumer Direct and B2B Operations", Business Wire, Apr. 17, 2000.*

"A Continuous-Time Yield Management Model with Multiple Prices and Reversible Price Changes" by Feng et al, Management Science, May 2000, vol. 46, No. 5, pp. 644-657.*

"OpenTable.com Launches OTAdmin; First Full-Service Solution for Corporate Assistants Offers Online Access to Restaurant Reservations Nationwide", Business Wire, Aug. 16, 2000.*

"A Case Study of Singapore Airlines" by Melvin Lim, Mar. 1, 1996, web.singnet.com.sg/~ciminfot/rsch.htm.*

"Xchange Inc Reports Record Revenue and Earnings for Q1 2000; Pro Forma Operating Income up 460 percent over Q1 1999", PR Newswire, Apr. 24, 2000.*

"Rapt Leads Market in delivering First Solution for Dynamic Commerce Management", PR Newswire, Aug. 30, 2000.*

"Perishable-asset revenue management: Generic and multiple-price yield management with diversion", by Bodily et al, Omega, Apr. 1995, vol. 23, iss 2.*

"An analysis of bid-price controls for Network Revenue Management" by Talluri et al, Management Science, vol. 44, No. 11, Nov. 1998.*

Talluri et al "An analysis of Bid-Price Controls for Network Revenue Management", Nov. 1998, Management Science/vol. 44, No. 11, Part 1 and 2. Pages.*

Gallego "A Multiproduct Dynamic Pricing Problem and Its Applications to Network Yield management", Feb. 1997, Operations Research vol. 45, No. 1.*

* cited by examiner

GENERIC REVENUE MANAGEMENT DATA MODEL FOR REVENUE MANAGEMENT

RELATED INFORMATION

This application claims priority under 35 U.S.C. § 119(e) to U.S. Provisional Patent Application No. 60/239,448 filed Oct. 11, 2000, entitled "Revenue Management (RM) Data Model," which is hereby fully incorporated by reference.

FIELD OF THE INVENTION

The present invention relates generally to revenue management, and more a particularly to a generic revenue management data model for revenue management problems.

BACKGROUND OF THE INVENTION

Revenue management is an operations research technique that focuses on controlling access to inventory in order to maximize profit through, for example, contracting the supply or manipulating the price. Companies can employ revenue management to help select those demands for services that are profitable, while eschewing those that are costly. Revenue management can help a company determine which demands a company should accept now and which demands it should accept in the future.

Revenue management systems use various algorithms to facilitate the development of demand selection rules for a company. In the airline industry, for example, the Expected Marginal Seat Revenue ("EMSR") is a commonly employed algorithm used to help airlines determine how many seats can be sold in a particular fare class. In this context, a fare class does not necessarily represent the difference between the first-class and coach compartments, but can represent the difference between a last minute business traveler and an advance purchase leisure traveler in the same compartment. By using EMSR, airlines can better determine when and at what price tickets should be sold. Unfortunately, EMSR only allows for optimization at the local level and is not applicable to optimization at the network level.

Each algorithm or optimization scheme employed, whether it is EMSR or another algorithm, and whether it is employed in the airline industry or in an other industry, relies on a data model. Currently, the data models employed by revenue management are specific to the algorithm or industry to which they are used. For instance, the data model for EMSR would only include data on flights, compartments and fare classes. Thus, the revenue management data model currently employed by EMSR is specific to the airline industry and the EMSR algorithm.

Because current revenue management data models are algorithm or industry specific, they lack flexibility. Each different optimization scheme requires a unique revenue management data model, and new optimization schemes can not be easily integrated with existing revenue management data models. As a further limitation, algorithm specific revenue management data models do not easily facilitate the sequencing of algorithms.

SUMMARY OF THE INVENTION

The present invention provides a "generic" revenue management data model that substantially eliminates or reduces the disadvantages and problems associated with previously developed revenue management data models. The generic revenue management data model of the present invention can include a first data structure containing a representation of a set of network demands, a second data structure containing a representation of a set of network resources, a third data structure containing a representation of a set of resource bundles and a fourth data structure containing a representation of a set of resource bundle to demand links. The data model of the present invention can also include a fifth data structure, which includes a representation of a set of resource demands.

The present invention provides a substantial advantage over previously developed revenue management data models because the present invention is industry independent.

The present invention provides another important technical advantage over previously developed revenue management data models because the present invention is algorithm independent.

The present invention provides yet another important technical advantage over previously developed revenue management data models by facilitating the sequential application of optimization algorithms.

The present invention provides yet another important technical advantage over previously developed revenue management data models by facilitating the application of new revenue management algorithms.

The present invention provides yet another important technical advantage over previously developed revenue management data models by facilitating the decomposition of network problems to allow for local optimization.

The present invention provides yet another important technical advantage over previously developed revenue management data models because, from a training perspective, the present invention provides a unified language in which to express revenue management problems.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Revenue management seeks to optimize profit, for example, by limiting access to inventory either by, for example, reducing the supply of a product or by manipulating the product's price. Typically, revenue management techniques apply mathematical algorithms (which can be contained in software programs stored on a tangible storage medium) to a set of revenue management problem data for the purpose of determining the optimal quantity or optimal price of a product. The present invention provides a generic revenue management data model for representing revenue management problems. Because the revenue management data model is generic, it is applicable to any number of industries, it can be used by many different algorithms and it facilitates both local and network optimization.

Figure 1:
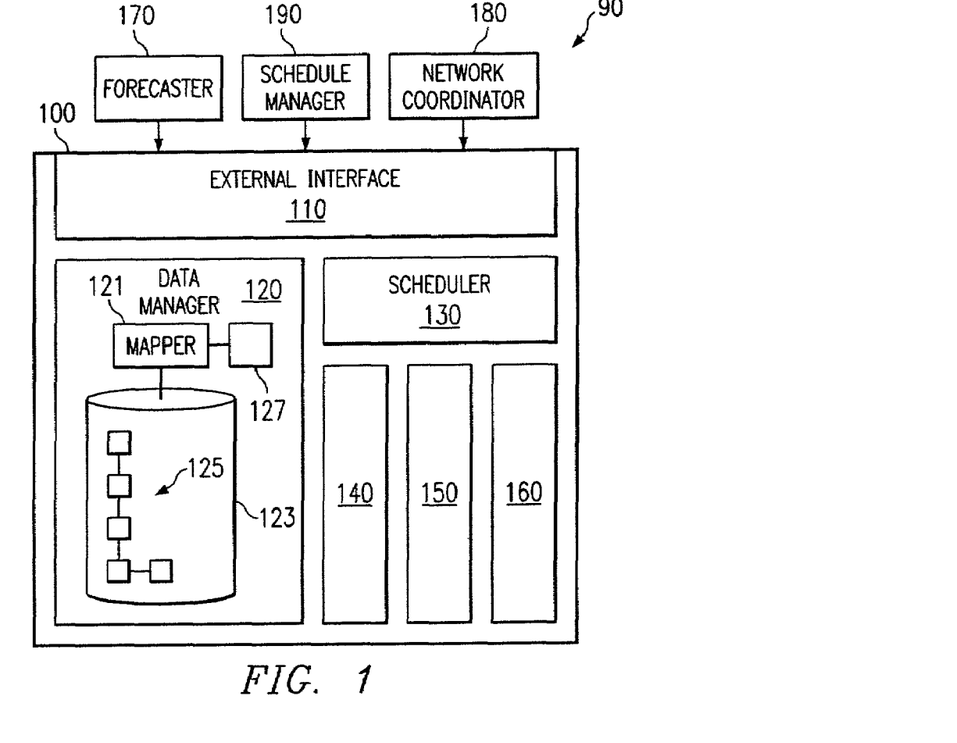
FIG. 1 is a diagrammatic representation of one embodiment of a system for solving revenue management problems according to the present invention.

FIG. 1 is a diagrammatic representation of one embodiment of a system 90 for solving revenue management problems. In system 90, revenue management problems can be solved by optimization engine 100. Optimization engine 100 can use software programming stored on a tangible storage medium to apply various algorithms to network data in order to determine the optimal supply and price values for products, such as airline tickets or advertising space, in a network. Optimization engine 100 can include external interface 110, data manager 120, scheduler 130 and solvers 140, 150 and 160. Optimization engine 100 can accept revenue management problem data and scheduling information from external systems such as forecaster 170, network coordinator 180 and schedule manager 190. Revenue management problem data might include data related to the demands placed on a network and the supply of products available in the network. For instance, optimizer 100 might receive a prediction of the demand for products from forecaster 170, receive information on supply from network coordinator 180 and receive scheduling information from schedule manager 190 (collectively called "problem information"). Problem information can be received by optimization engine 100 through external interface 110. Upon receiving the problem information, external interface 110 can split the problem information into revenue management problem data and optimization sequence data. The revenue management problem data and optimization sequence data can each be stored on a tangible storage medium. Furthermore, it should be understood that each of 110-190 can be stored on a tangible storage medium and can include software instructions which can be executed to perform the functionality described herein.

Revenue management problem data can be communicated from external interface 110 to data manager 120. Data manager 120 can include mapping software program 121 and database 123 for storing the data. When revenue management problem data is received by data manager 120 from external interface 110, mapping software program 121 can map the revenue management problem data to database 123. More particularly, mapping software program 121 can map the revenue management problem data to database 123 in the format of generic revenue management data model 125. Generic revenue management data model 125, which will be discussed in greater detail in conjunction with FIG. 2, allows data for multifarious revenue management problems to be expressed in a uniform format.

In an alternative embodiment, rather than mapping data to database 123, mapping software program 121 maps revenue management problem data to memory 127 according to generic revenue management data model 125. In this embodiment, data manipulation and mapping can both be performed in memory 127. At the end of all optimization steps, the solutions and/or revenue management problem data can be written to database 123 and communicated to a user through external interface 110.

Whereas revenue management problem data can be communicated to data manger 120, scheduling information can be passed to scheduler 130. Scheduler 130, based on the scheduling information, can determine the sequence in which solvers 140, 150 and 160 should apply optimization algorithms to the revenue management problem data stored in generic revenue management data model 125. It should be understood that any number of "solver" programs can be used in conjunction with the present invention. These solvers can apply revenue management algorithms to the revenue management problem data in order to achieve optimal decision rules. As an example, solver 140 might take the data from generic revenue management data model 125, derive an optimal solution for the network, and return the network-wide solution to data manager 120. Solver 150 could then decompose the network to determine how the network optimization solution affects local resources. After the network has been decomposed, solver 160 might apply an algorithm to the data in generic revenue management data model 125 to derive locally optimal solutions. When a particular solver applies an algorithm to the data stored in generic revenue management data model 125, mapping software program 121 can map the results to database 123 and/or generic revenue management data model 125. Thus, at any given time, generic revenue management data model 125 can include, among other potential data, problem definitions, intermediate calculations and/or optimal revenue management values.

Figure 2:
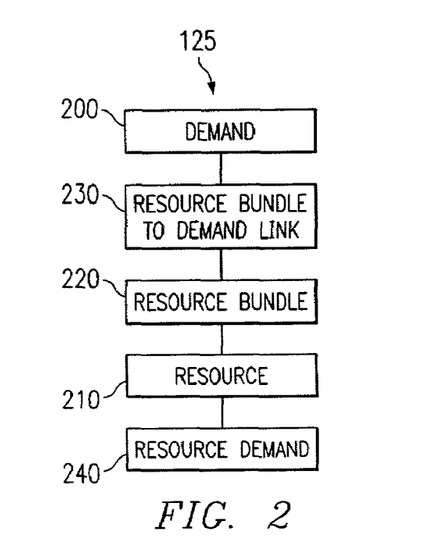
FIG. 2 is a diagrammatic representation of one embodiment of a generic revenue management data model according to the present invention.

FIG. 2 is a diagrammatic representation of generic revenue management data model 125, which can be used to organize revenue management problem data. To aid in a better understanding of generic revenue management data model 125, several terms and concepts shall be explained. For example, "Resources" can be the discrete items that a company offers to satisfy a demand. A resource can have as an attribute a capacity value that measures the ability of the resource to contribute to the satisfaction of a demand. In the case of the airline industry, for example, a resource could be a seat in the economy class of a plane for a flight leg (a leg is the flight between two airports, not necessarily between an origin and the ultimate destination).

"Demand" can be the demand placed on a network for a particular item or combination of items. Again, using the airline industry an example, a "demand" might be the demand for a flight from Austin, Tex. to Washington, D.C. Because this itinerary might involve changing planes at an intermediate airport (e.g., Atlanta) the demand may not be directly linked to individual resources. Generally, the demands on a network can be estimated using a demand function. Thus, the demand might not represent an actual demand (e.g., actual ticket purchases), but could be a forecasted demand. In terms of FIG. 1, the demands could, in one embodiment, be provided by forecaster 170. Along with the forecasted demand, a demand can also include the accumulation or diminishment of actual demands. For example, in the airline industry, a demand might account for actual tickets purchased and actual cancellations.

While resources are the discrete items offered to satisfy a demand, a "resource bundle" can be a set of resources that are combined to form a product or service. In some cases, a resource bundle can be associated with a single resource (e.g., a seat on a direct flight from Austin to Dallas can be both a resource and a resource bundle). In other cases, a resource bundle can be associated with multiple resources (e.g., a resource bundle of a seat on a flight from Austin to Washington, D.C. can include an Austin to Atlanta flight and an Atlanta to Washington, D.C. flight). Resource bundles are generally defined externally to optimization engine 100. For example, an airline can predetermine which resource bundles offer a reasonable a transportation service.

A "resource bundle to demand link" can associate the resource bundles with the demands that each resource bundle satisfies. The resource bundle to demand links can exist based on the relationships that exist internally to the network. For example, if a passenger wished to fly from point A point D, an airline might offer several resource bundles that satisfy that demand. These might include a direct point A to point D flight (A-D), a point B to point A to point D itinerary (B-A-D) or a point A to point C to point D itinerary (A-C-D). Each of these resource bundles could satisfy a passengers demand to fly from point A to point C to point D (A-C-D), and can thus be linked to that demand.

Generic revenue management data model 125 can be used to represent revenue management data using several data structures. Generic revenue management data model 125 can include a demand data structure 200, which can contain a representation of a set of network demands. Demand data structure 200 can be used to enumerate all the different demand types that a network is experiencing or any subset thereof. For an airline, demand data structure 200 could contain a representation all the demands for various flights, at different prices (i.e., "fare classes"), experienced by the airline.

Along with demand data structure 200, generic revenue management data model 125 can include a resource data structure 210, which can contain a representation of a set of network resources. For an airline, this might include a representation of all the flight legs that an airline offers.

Generic revenue management data model 125 can further include a resource bundle data structure 220 that can contain a representation of a set of resource bundles. It should be recalled that a resource bundle could be a group of resources that are combined to form a product or service. Again, using the example of an airline, a resource bundle data structure could contain a representation of all the itineraries that an airline offers.

Resource bundle data structure 220 can be associated with demand data structure 200 through resource bundle to demand link data structure 230. Resource bundle to demand link data structure 230 can contain a representation of the associations between the resource bundles represented in resource bundle data structure 220 and the demands represented in demand data structure 200.

A generic revenue management data model 125 which includes a demand data structure 200, resource data structure 210, resource bundle data structure 220 and resource bundle to demand link data structure 230 can be appropriate for revenue management problems which require a network representation. However, many revenue management optimization algorithms do not account for network dependencies, and only function on a local level. For example, in the airline industry, the very common EMSR algorithm optimizes only one resource at a time, while ignoring other resources. In order to facilitate the use of local optimization algorithms, generic revenue management data model 125 can include a resource demand data structure 240. Resource demand data structure 240 can contain a representation of the demands placed on individual resources ("resource demands"). In the case of the airline industry, for example, the resource demand might be the demand placed on a seat in economy class for a particular flight leg. It should be noted that demand data structure 200, resource data structure 220, resource bundle to demand link data structure 230 and resource demand data structure 240 can all include data stored on a database on a tangible storage medium.

As discussed in conjunction with FIG. 1, one advantage of generic revenue management data model 125 is that algorithms can be applied to the data contained therein in various sequences. For example, an algorithm might first be applied to generic revenue management data model 125 to optimize the network. A second algorithm could then use the result the of the network optimization to decompose the network and populate resource demand data structure 240. In the context of optimization engine 100 optimizing an airline network, this might first involve solver 140 applying demand to come linear programming to the data in generic revenue management data model 125 in order to determine the optimal bundles to satisfy the network demands. Then, solver 150 could apply a second algorithm to decompose the network and determine the demands for individual resources. The resource demands would be stored in resource demand data structure 240. Solver 160 could then optimize the network at a local level by applying a third algorithm, such as EMSR, to the data in resource data structure 210 and resource demand data structure 240. By applying the algorithms in this manner, the both the network as a whole and individual local resources can be optimized.

The foregoing example was for illustrative purposes, and it should be understood that a variety of revenue management algorithms could be applied to generic revenue management data model 125 in various sequences. It should be understood that the information stored in generic revenue management data model 125 can be dependent on or independent of the particular sequence of optimization algorithms that are applied to generic revenue management data model 125.

Along with supporting the sequential application of optimization algorithms, generic revenue management data model 125 provides many important advantages. For revenue managers, these advantages include the industry independence of generic revenue management data model 125, the ability to seamlessly integrate disparate optimization approaches using generic revenue management data model 125, the ability to integrate new optimization algorithms as they are developed, the increased ease with which network problems can be decomposed for local optimization and, from a training standpoint, the option to use a unified language for expressing revenue management problems.

Figure 3:
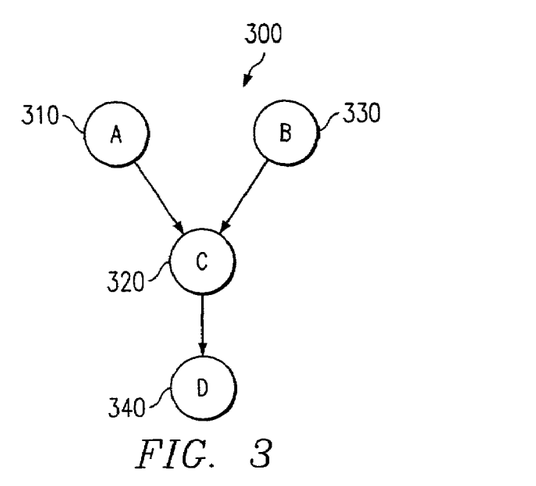
FIG. 3 is a diagrammatic representation of an example airline network to which the present invention could be applied.

Although the present invention has previously been described in detail, an illustrative example of a network to which the present invention could be applied would aid in an understanding of the benefits and flexibility of the present invention. FIG. 3 is a diagrammatic representation of an example airline network 300 to which the present invention could be applied. In airline network 300, an airline might offer a flight from city A (node 310) to city C (node 320), the A-C flight, a flight from city B (node 330) to city C, the B-C flight, and a flight from city C to city D (node 340) the C-D flight. Because A-C, B-C and C-D could each be a single flight leg, they would be the resources of airline network 300 and could represented in resource data structure 210. For the sake of simplicity, in this example, the airline only offers three flights: A-C, B-C and C-D.

Based on the three resources offered in airline network 300, an airline would group flights together to offer a putatively reasonable transportation service. Hypothetical resource bundles might include an A-C itinerary, a B-C itinerary, the C-D itinerary, an A-C-D itinerary (e.g., the A-C flight connecting with the C-D flight), and a B-C-D itinerary (e.g., the B-C flight connecting with the C-D flight). Table 1 summarizes the set of resource bundles that could be represented in resource bundle data structure 220.

TABLE 1

Resource Bundles

A-C
B-C
A-C-D
B-C-D
C-D

In airline network 300, passengers desiring to go to various destinations in airline network 300 will place different demands on the network. Additionally, passengers may be willing to pay different amounts for the same itinerary. For example, a leisure passenger who books a flight early may only be willing to pay $90 for the A-C-D itinerary, while a last minute business passenger would be willing to pay $100 for the same itinerary. Table 2 summarizes an exemplary set of demands that can be placed on airline network 300. Table 2 includes the possible itineraries, given that there are only three flights in airline network 300, the fare class of each demand (e.g., class I or class II, which are last minute or advance purchases respectively), the ticket price and the number of tickets demanded. The hypothetical demands contained in Table 1 could be based on ticket purchases or could be provided by a forecaster, such as forecaster 170.

TABLE 2

| Itinerary | Fare class | Price | Number |
| --- | --- | --- | --- |
| A-C | I | $100 | 60 |
| A-C | II | $90 | 90 |
| A-C-D | I | $120 | 30 |
| A-C-D | II | $110 | 30 |
| B-C | I | $80 | 10 |
| B-C | II | $70 | 80 |
| B-C-D | I | $150 | 30 |
| B-C-D | II | $130 | 50 |
| C-D | I | $70 | 20 |
| C-D | II | $60 | 10 |

As can be understood from Table 2, when applied to the demand data, forecaster 170 could predict that 60 people might demand a $100 ticket for an A-C itinerary, 90 people might demand a $90 ticket for the A-C itinerary, 30 might demand a $120 ticket for an A-C-D itinerary and so on. The set of demands contained in Table 2 can be represented by and stored as demand data structure 200 of generic revenue management data model 125. It should be recalled that airline network 300 includes only an A-C, B-C and C-D flight, whereas in the case of an actual airline, the number of resources would be much greater, leading to hundreds of thousands or millions of demands.

The demands listed in Table 2 might only be satisfied by particular resource bundles. Table 3 associates or links each demand to the resource bundles that satisfy that demand. For simplicity each demand is described only in terms of the itinerary and fare class (the first and second columns of Table 2). The third column lists the resource bundles from Table 1 that can satisfy each demand.

TABLE 3

| Itinerary | Fare class | Resource Bundles from Table 1 That Satisfy Each Demand |
| --- | --- | --- |
| A-C | I | A-C |
| A-C | II | A-C |
| A-C-D | I | A-C-D |
| A-C-D | II | A-C-D |
| B-C | I | B-C |
| B-C | II | B-C |
| B-C-D | I | B-C-D |
| B-C-D | II | B-C-D |
| C-D | I | C-D |
| C-D | II | C-D |

As illustrated by Table 3, the A-C resource bundle satisfies both the fare class I and fare class II demands for a flight from A to C, the A-C-D resource bundle satisfies both the fare class I and fare class II demands for a flight from A to D via C, and so on. In this example, the A-C and C-D resource bundles would not be linked together to satisfy the A-C-D demands because all of the A to C to D itineraries are encompassed by the A-C-D resource bundle, as there are only three flights offered in airline network 300. Furthermore, the A-C-D resource bundle would not satisfy the A-C demands, because from the perspective of the network, the passenger demanding an A-C-D ticket, regardless of if they debarked at C, would place a demand to proceed to D. The linkages between resource bundles and demands represented in Table 3 can be represented by and stored in database 123 as resource bundle to demand link data structure 230 of generic revenue management data model 125.

Based on the information stored in demand data structure 200, resource data structure 210, resource bundle data structure 220 and resource bundle to demand link data structure 230, a revenue management software program could perform a network optimization. For example, demand to come linear programming could be applied to generic revenue management data model 125 in order to determine which resource bundles should handle which demands. Additionally, a revenue manager could apply an algorithm to generic revenue management data model 125 in order to decompose the network and determine the resource demands. The resulting resource demands could be represented by and stored in database 123 as resource demand data structure 240. Alternatively, if sufficient information was available about the demands on each resource, resource demand data structure could be populated with that information. Based on the contents of resource data structure 210 and resource demand data structure 240, a revenue management software program could then apply a local optimization scheme to the data in generic revenue management data model 125. In the case of airline network 300, this might entail applying an EMSR algorithm to generic revenue management data model 125. The EMSR could be used to determine how many seats on each plane should be reserved for fare class I and/or fare class II passengers and are what price the tickets should be sold.

As can be understood from FIG. 3 and the accompanying discussion, the data structures in generic revenue management data model 125 can be used to represent and store revenue management problems. In FIG. 3, a simple airline network was chosen as the primary example because many revenue management concepts and algorithms are developed in the context of the airline industry. However, generic revenue management data model 125 is industry independent and can be applied to a wide variety of markets. For example, generic revenue management data model 125 could be used to represent revenue management problems for the broadcasting industry. In broadcasting, a resource could be an advertising time slot, the demand could be the demand to show different commercials and a resource bundle might be a set of commercial time slots in certain types of shows. The resource bundle to demand links could be determined from the demands placed on the resource and the resource bundles offered by a broadcaster. As would be understood by one of ordinary skill in the art, generic revenue management data model 125 can thus be used to represent revenue management problems from many different industries.

Figure 4A:
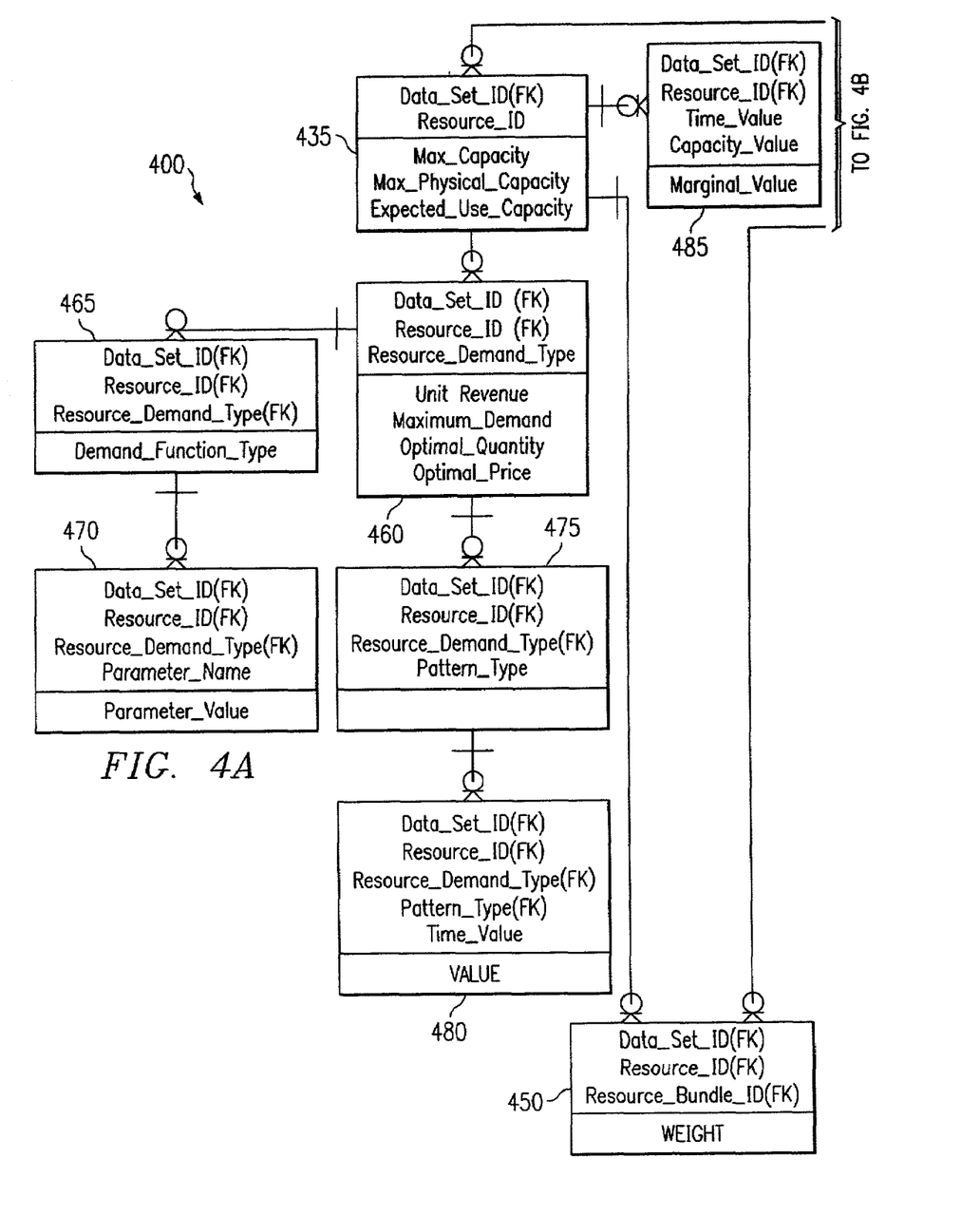
FIGS. 4A and 4B show an entity relationship diagram for one example of a database for representing revenue management problems according to the present invention.
Figure 4B:
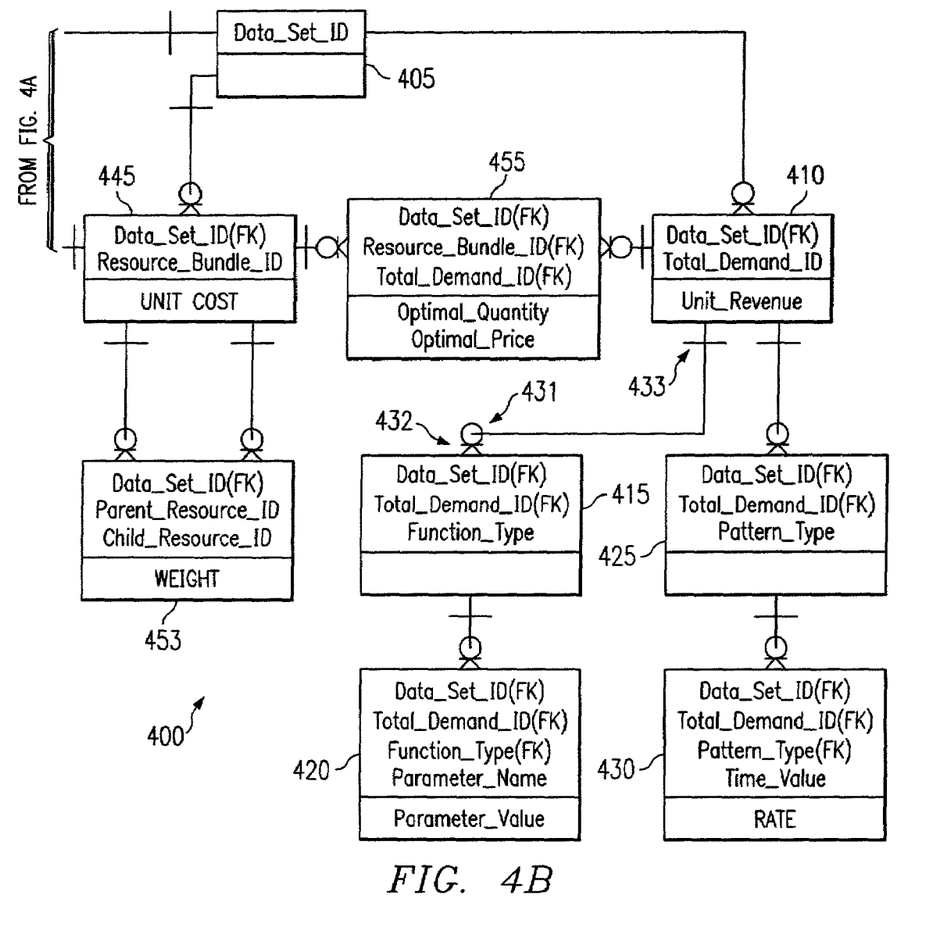

Referring now to FIGS. 4A and 4B, one example of entity relationship diagram 400 is shown for one embodiment of a database incorporating generic revenue management data model 125 for revenue management in a transportation revenue industry. It should be noted that FIGS. 4A and 4B present different portions of the same entity relationship diagram. For the sake of explanation, entities 405-435 appear in FIG. 4B and entities 435-485 appear in FIG. 4A. In entity relationship diagram 400, data set entity 405 can be used to distinguish multiple data sets, thus allowing several data sets to be maintained simultaneously. Data set entity 405 can contain a data set ID so that the various data sets can be appropriately identified. If a revenue manager was servicing multiple clients at the same time, data set ID could ensure that the different data sets would not be combined or commingled.

Total demand entity 410 can represent the total demand placed on a network. Total demand entity 410 can include a data set ID to associate the total demand with appropriate data set, a total demand ID to identify the total demand and a fare value to represent the revenue realized for each unit of total demand satisfied. The total demand can be based upon a demand function, represented by total demand function entity 415. Total demand function entity 415 can include a data set ID for associating the function with the appropriate data set, a total demand ID to associate the total demand function with the appropriate total demand and a function type to describe the demand function.

The demand function associated with demand function entity 415 can depend upon various parameters. Each of these parameters can be represented by a total demand function parameter entity 420, which can include a data set ID to associate the parameter with the appropriate data set, a total demand ID to associate the parameter with the appropriate total demand function, a function type to identify the name of the function type using the parameter, a parameter name to provide a unique name for each parameter and a parameter value to quantify the parameter.

In addition to being dependent on a total demand function, the total demand can be dependent on a time pattern. The time pattern can be represented by total demand time pattern entity 425. Total demand time pattern entity can include a data set ID to associate the demand time pattern with the appropriate data set, a total demand ID to associate the total demand time pattern with the appropriate total demand and a pattern type to classify the total demand time pattern.

Time patterns can be important to revenue management because different types of demands have different arrival patterns. Returning to the example of the airline industry, leisure travelers tend to book flights early and pay less, while business travelers are willing to pay more for the same seat at the last minute. The total demand time pattern entity 425 can represent this time dependence for demands.

In order to help develop a total demand time pattern, the number of demands relative to a service date can be tracked and the total demand time pattern can be extrapolated therefrom. The total demand time pattern for an airline could, for example, be extrapolated from data on the number bookings five days out, four days out, three days out and so on. Total demand time pattern value entity 430 can be used to represent this type of data. Total demand time pattern value entity 430 can include a data set ID to associate the total demand time pattern value with the appropriate data set, a total demand ID to associate the total demand time pattern value with the appropriate total demand, the pattern type to classify the total demand time pattern, the time value to index the demands relative to a service date, and a value to quantify the number of requests relative to the service date.

Incidentally, in FIGS. 4A and 4B, a circle such as circle 431 (FIG. 4B) indicates that an entity need not exist. For example, in entity relationship diagram 400, circle 431 indicates that total demand function entity 415 need not exist for total demand entity 410 to exist. A triangle or crowfoot, such as triangle 432 (FIG. 4B), indicates that many entities may exist if a parent entity exists. In the case of entity relationship diagram 400, triangle 432 could indicate that for each total demand entity 410, many total demand function entities, such as total demand entity 415, could exist. Thus, none to many total demand functions can exist for each total demand. A dash, such as dash 433, indicates that at least one such entity should exist if the dependent entities exist. For example, if there is at least one total demand function entity 415, there should be at least one total demand entity 410. To summarize, in the case of entity relationship diagram 400, there can be zero to many total demand function entities for each total demand entity, but and if there is at least one total demand function entity, there should be at least one total demand entity.

Returning now to the entities included in entity relationship diagram 400 of FIG. 4A, resource entity 435 can represent the network resources. Resource entity 435 can include a data set ID to associate resource entity 435 with the appropriate data set, a resource ID to identify a particular resource, a maximum capacity to represent the maximum accommodation for the resource, a maximum physical capacity to represent the actual physical capacity available for a resource and expected use capacity to represent the probable use for the resource. It should be noted that the maximum capacity might exceed the actual physical capacity of a resource. For instance, as most travelers have experienced, airlines often overbook flights by allowing for a maximum capacity on a plane that is greater than the actual physical capacity of the plane.

As will be recalled, resources can be grouped together into resource bundles. Resource bundles can be represented in entity relationship diagram 400 by resource bundle entity 445. Resource bundle entity 445 can include a data set ID to associate a resource bundle with an appropriate data set, a resource bundle ID to identify a particular resource and a unit cost to represent the cost associated with the consumption of a unit of the resource bundle. The association of resources with particular resource bundles can be represented by resource to bundle link entity 450. Resource to bundle link entity 450 can include a data set ID to associate the resource to bundle links with the appropriate data set, a resource ID to identify a particular resource and a resource bundle ID to identify a resource bundle to which a resource is associated. Resource to bundle link entity 450 can also include a weight to represent a resource's weight in relationship to other resources in the same data set. Essentially, in terms of entity relationship diagram 400, resource to bundle link entity 450 illustrates that one resource can be part of several bundles and one bundle can include several resources.

In addition to bundling resources into resource bundles, resource bundles can be bundled into larger bundles. This bundling of bundles can be represented by bundle to bundle link entity 453. Bundle to bundle link 453 can include a data set ID to identify the appropriate data set, a parent resource bundle ID to identify the bundle of resource bundles, a child resource bundle ID to identify a particular resource bundle and a weight to represent the relative weight of a particular bundle with respect to other resource bundles. The ability to bundle bundles can help facilitate certain optimization calculations, as would be understood by those of ordinary skill in the art.

The relationship between demands and resource bundles can be represented by resource bundle to demand link entity 455. Resource bundle to demand link entity 455 can include a data set ID to identify the appropriate data set, a resource bundle ID to identify a particular resource bundle and a total demand ID to identify the appropriate total demand to which a particular resource bundle can be associated. Additionally, resource bundle to demand link entity 455 can include an optimal quantity and optimal price. The optimal quantity can represent the optimal demand quantity that is served through the resource bundle identified by the resource bundle ID. The optimal price can represent the value to be charged for the total demand that maximizes the overall profit. Generally, the optimal quantity and optimal price can be added after a network optimization has been performed. For example, in the case of network 300 discussed in conjunction with FIG. 3, the optimal price and optimal value would be added after a network optimization algorithm (e.g., demand to come LP algorithm) had been applied to generic revenue management data model 125. As would be understood by those of ordinary skill in the art, these values can facilitate the decomposition of network problems into local optimization problems.

The local demand or resource demand can be represented by resource demand entity 460. Resource demand entity 460 can include a data set ID to associate the resource demand with the appropriate data set, a resource ID to identify the resource to which a resource demand applies and a resource demand type to classify the demand type. Resource demand entity 460 can also include a maximum demand to represent the maximum quantity sought, a unit revenue to represent the revenue that can be realized for each unit of resource demand that is satisfied, an optimal quantity to represent the optimal resource demand quantity that is served by a resource and an optimal price to represent the value to be charged for the resource to maximize the overall profit.

As with total demand, the resource demand can depend upon a demand function and a demand time pattern. The resource demand function can be represented by resource demand function entity 465. Resource demand function entity 465 can include a data set ID to identify the appropriate data set, a resource ID to identify the appropriate resource to which the function applies, a resource demand type to identify the resource demand and a demand function type to identify the demand function. Similarly to a total demand function, a resource demand function can depend upon parameters. Each of these parameters can be represented by resource demand function parameter entity 470, which can include a data set ID to identify the appropriate data set, a resource ID to identify the resource to which the demand function applies, a resource demand type to classify the resource demand, a parameter name to identify the particular parameter and a parameter value.

The time pattern upon which a resource demand can depend can be represented by resource demand time pattern entity 475. Resource demand time pattern entity 475 can include a data set ID to identify the appropriate data set, a resource ID to identify the resource to which the time pattern applied, a resource demand type to classify the resource demand and a pattern type to identify the time pattern. Each of the values associated with a resource demand time pattern can be represented by resource demand time pattern value entity 480. Resource demand time pattern value entity 480 can include a data set ID to identify the appropriate data set, a resource ID to identify the resource to which a time pattern applies, a pattern type to identify the time pattern to which a time pattern value applies, a time value to index to identify the time pattern value and a value to represents the resource demand as it occurs relative to the provision of a service.

In addition to representing the demands placed on a particular resource, entity relation diagram can represent the marginal values of each resource at marginal value entity 485. Marginal value entity 485 can include a data set ID to identify the appropriate ID, a resource ID to identify the resource to which a marginal value applies, a time value to index the marginal value, a capacity value to represent the unit amount of resource to which a marginal value applies and a marginal value for the resource.

Table 4 summarizes the entities included in entity relationship diagram 400. Table 4 includes the entity name, the key attributes of each entity and a description of each entity.

TABLE 4

| Entity Name | Entity Primary Key Attribute Name | Description |
| --- | --- | --- |
| Bundle_to_Bundle_Link | Data_Set_ID, Parent_Resource_Bundle_ID, Child_Resource_Bundle_ID | A weighted association for building complex networks consisting of resource bundles. |
| Data_Set | Data_Set_ID | A collection of elements describing a revenue management problem in terms of resources, resource bundles, and total demand. |
| Marginal_Value | Data_Set_ID, Resource_ID, Time_Value, Capacity_Value | The value of a resource as the capacity is decreased by a unit or time elapses. |
| Resource | Data_Set_ID, Resource_ID | The basic unit used to describe the supplying company's production abilities. |
| Resource_Bundle | Data_Set_ID, Resource_Bundle_ID | A named group of resources or of resource bundles. |
| Resource_Bundle_ | Data_Set_ID, | An association of resource bundles to total |

TABLE 4-continued

| Entity Name | Entity Primary Key Attribute Name | Description |
|---|---|---|
| to_Demand_Link | Resource_Bundle_ID, Total_Demand_ID | demand describing what demand could (and should) be satisfied by what resource bundle. |
| Resource_Demand | Data_Set_ID, Resource_ID, Resource_Demand_Type | A named demand type for a given resource. This entity scopes either a demand function definition or a time pattern of both. |
| Resource_Demand_Function | Data_Set_ID, Resource_ID, Resource_Demand_Type | A named demand function that owns a set of parameters for a resource demand. |
| Resource_Demand_Parameter | Data_Set_ID, Resource_ID, Resource_Demand_Type | A named parameter value used to describe the resource demand functions. |
| Resource_Demand_Time_Pattern | Data_Set_ID, Resource_ID, Resource_Demand_Type, Pattern_Type | A collection of time indexed data that is used to model the demand as it accumulates (or diminishes) for a resource. |
| Resource_Demand_Time_Pattern_Value | Data_Set_ID, Resource_ID, Resource_Demand_Type, Pattern_Type, Time_Value | A time indexed value in the resource demand time pattern. |
| Resource_to_Bundle_Link | Data_Set_ID, Resource_ID, Resource_Bundle_ID | The weighted association of a resource to a resource bundle. |
| Total_Demand | Data_Set_ID, Total_Demand_ID | The customer demand for a product or service provided by the supplying company. |
| Total_Demand_Function | Data_Set_ID, Total_Demand_ID, Function Type | A named demand function that owns a set of parameters describing the dependency of total demand on price. |
| Total_Demand_Function_Parameter | Data_Set_ID, Total_Demand_ID, Parameter_Name | A named value for a total demand function. |
| Total_Demand_Time_Pattern | Data_Set_ID, Total_Demand_ID, Pattern_Type | A historical collection of time indexed data that is used to model the total demand. |
| Total_Demand_Time_Pattern_Value | Data_Set_ID, Total_Demand_ID, Pattern_Type, Time_Value, | A time indexed value in the total demand time pattern. |

Table 5 summarizes the key attributes of each entity of entity relationship diagram 400. Table 5 includes name of each entity, the name of each entity attribute, an exemplary data type for each attribute and a brief description of each attribute.

TABLE 5

| Entity Name | Entity Attribute Name | Entity Table Column Datatype | Description |
|---|---|---|---|
| Bundle_to_Bundle_Link | Data_Set_ID | NUMBER | Identifier of data associated with owning bundle |
| | Parent_Resource_Bundle_ID | NUMBER | Identifier of owning bundle |
| | Child_Resource_Bundle_ID | NUMBER | Identifier of member bundle |
| | Weight | NUMBER | Member bundle's weight in relationship to other member bundles |
| Data_Set | Data_Set_ID | IDENT | Identifier of the data set |
| Marginal_Value | Data_Set_ID | IDENT | Identifier of the data set associated with the resource |
| | Resource_ID | NUMBER | Identifier of the owning resource |
| | Time_Value | NUMBER | Time index of the marginal value |
| | Capacity_Value | NUMBER | Unit amount of resource marginal value applies |
| | Marginal_Value | NUMBER | The marginal value |
| Resource | Data_Set_ID | NUMBER | Identifier of the data set associated with the resource |
| | Resource_ID | IDENT | Identifier for the resource |
| | Capacity | NUMBER | Maximum accommodation for the resource |
| | Expected_Use_Capacity | NUMBER | The probable use of the resource |

TABLE 5-continued

| Entity Name | Entity Attribute Name | Entity Table Column Datatype | Description |
|---|---|---|---|
| Resource_Bundle | Data_Set_ID | NUMBER | Identifier of the data set associated with this bundle |
| | Resource_Bundle_ID | IDENT | Identifier of the bundle |
| | Unit_Cost | NUMBER | Cost associated with the consumption of a unit of the resource_bundle |
| Resource_Bundle_to_Demand_Link | Data_Set_ID | NUMBER | Identifier for the data set associated with the resource bundle |
| | Total_Demand_ID | NUMBER | Identifier of the total demand |
| | Resource_Bundle_ID | NUMBER | Identifier for the resource bundle |
| | Optimal_Quantity | NUMBER | Profit optimal demand quantity that is served through this resources bundle |
| | Optimal_Price | NUMBER | Price value to be charged for the total demand that maximizes the overall profit |
| Resource_Demand_Function | Data_Set_ID | NUMBER | Identifier of the data set associated with the owning resource |
| | Resource_ID | NUMBER | Identifier of the owning resource |
| | Resource_Demand_Type | CHAR(3) | Name of the demand classification |
| | Demand_Function_Type | CHAR(3) | Name of the function |
| Resource_Demand_Function_Parameter | Data_Set_ID | NUMBER | Identifier of the data set associated with the owning resource |
| | Resource_ID | NUMBER | Identifier of the owning resource |
| | Resource_Demand_Type | CHAR(3) | Name of the demand classification |
| | Parameter_Name | CHAR(3) | Unique name of the parameter |
| | Parameter_Value | NUMBER | Value for the parameter |
| Resource_Demand_Time_Pattern | Data_Set_ID | NUMBER | Identifier of the data set associated with the owning resource |
| | Resource_ID | NUMBER | Identifier of the owning resource |
| | Resource_Demand_Type | CHAR(3) | Name of the demand classification |
| | Pattern_Type | CHAR(3) | Name of the pattern classification |
| Resource_Demand_Time_Pattern_Value | Data_Set_ID | NUMBER | Identifier of the data set associated with the owning resource |
| | Resource_ID | NUMBER | Identifier of the owning resource |
| | Resource_Demand_Type | CHAR(3) | Name of the demand classification |
| | Pattern_Type | CHAR(3) | Name of the pattern classification |
| | Time_Value | CHAR(3) | Index for the value (time based) |
| | Value | NUMBER | Value (e.g., rate) of the resource demand as it occurs relative to the time of the service delivery |
| Resource_to_Bundle_Link | Data_Set_ID | NUMBER | Identifier of the data set associated with the member resource |
| | Resource_ID | NUMBER | Identifier of the member resource |
| | Resource_Bundle_ID | NUMBER | Identifier of the owning bundle |
| | Weight | | Member resource's weight in relationship to other member resources |
| Total_Demand | Data_Set_ID | NUMBER | Identifier of the data set for this total demand |
| | Total_Demand_ID | IDENT | Identifier for the total demand |
| | Unit_Revenue | NUMBER | Revenue realized for each unit of the total demand satisfied |
| Total_Demand_Function | Data_Set_ID | NUMBER | Identifier for the data set associated with the owning total demand |
| | Total_Demand_ID | NUMBER | Identifier for the total demand |
| | Function_Type | CHAR(3) | Name of the function |
| Total_Demand_Function_Parameter | Data_Set_ID | NUMBER | Identifier of the data set associated through the owning total demand |
| | Total_Demand_ID | NUMBER | Identifier of the owning total demand |
| | Function_Type | CHAR(3) | Name of the function type using this parameter |
| | Parameter_Name | CHAR(3) | Unique name of the parameter |
| | Parameter_Value | NUMBER | Value for the parameter |
| Total_Demand_Time_Pattern | Data_Set_ID | NUMBER | Identifier of data set associated through the owning total demand |
| | Total_Demand_ID | NUMBER | Identifier for the owning total demand |
| | Pattern_Type | CHAR(18) | Name of the pattern classification |
| Total_Demand_Time_Pattern_Value | Data_Set_ID | NUMBER | Identifier of data set associated through the owning total demand |
| | Total_Demand_ID | NUMBER | Identifier for the owning total demand |
| | Pattern_Type | CHAR(3) | Name of the pattern classification |

TABLE 5-continued

| Entity Name | Entity Attribute Name | Entity Table Column Datatype | Description |
|---|---|---|---|
| | Time_Value | NUMBER | Index for the value (time based) |
| | Value | NUMBER | Value (e.g., rate) of the total demand as it occurs relative to the time of the service delivery |

As would be understood to those of ordinary skill in the art, a database or memory structure can be constructed which includes generic revenue management data model 125. Generic revenue management data model 125 provides many benefits to the field of revenue management. Generic revenue management data model 125 is both industry and algorithm independent, and can thus be used in the optimization of a wide variety of networks. Additionally, because generic revenue management data model 125 is algorithm independent, new algorithms can be applied to generic revenue management data model 125 as the science of revenue management progresses. Generic revenue management data model 125 also facilitates the sequencing of algorithms to allow for both global and local optimization of a network. From a training perspective, the present invention can provide a unified language for dealing with revenue management problems, thus simplifying the revenue management lexicon.

Although the present invention has been described in detail, it should be understood that various changes, substitutions and alternations can be made hereto without departing from the spirit and scope of the invention as described in the appended claims.

The invention claimed is:

1. A computer-readable medium storing computer-executable instructions implementing an industry-independent revenue management data model which is accessible by a revenue management software program being executed on a data processing system in a network and which comprises:
    a first data structure for storing a representation of one or more network demands, each of which forecasts a number of requests expected for an item or a combination of items in the network;
    a second data structure for storing a representation of one or more network resources, wherein each network resource has at least one attribute for measuring an ability to contribute to a satisfaction of the one or more network demands;
    a third data structure for storing a representation of one or more resource bundles, wherein each resource bundle represents a single resource or a group of resources residing in the second data structure and wherein the group of resources are combinable to form a product or service; and
    a fourth data structure for storing a representation of associations between the one or more resource bundles and the one or more network demands; wherein the first data structure is associated with the third data structure via the fourth data structure;
    wherein the computer-executable instructions are further executable to:
        split problem information into revenue management problem data and optimization sequence data;
        map the revenue management problem data to the industry-independent revenue management data model; and
        based on the optimization sequence data, apply one or more revenue management problems to the revenue management problem data in the industry-independent revenue management data model to derive an optimal network-wide solution for the network.

2. The computer-readable medium of claim 1, wherein each association residing in the fourth data structure associates a resource bundle residing in the third data structure to a network demand residing in the first data structure.

3. The computer-readable medium of claim 1, wherein the second data structure further includes:
    for each network resource,
    a representation of the maximum capacity of the network resource;
    a representation of the physical capacity of the network resource; and
    a representation of the expected use capacity of the network resource.

4. The computer-readable medium of claim 1, wherein the fourth data structure further comprises:
    for each association,
    a representation of an optimal quantity; and
    a representation of an optimal price.

5. The computer-readable medium of claim 1, wherein the network is an airline network, an advertising network, a broadcasting network, or a transportation revenue network.

6. The computer-readable medium of claim 1, wherein the network is an airline network and wherein the one or more network demands further comprise:
    at least one itinerary demand; and
    at least one fare class demand for one or more flights in the airline network.

7. The computer-readable medium of claim 6, wherein a network resource includes a seat on a flight leg.

8. The computer-readable medium of claim 7, wherein the resource bundle linked to the network resource includes an origin to destination itinerary.

9. The computer-readable medium of claim 8, wherein an association residing in the fourth data structure associates the origin to destination itinerary residing in the third data structure with an itinerary demand residing in the first data structure.

10. The computer-readable medium of claim 1, further comprising a fifth data structure representing a resource demand.

11. The computer-readable medium of claim 10, wherein the resource demand represents a total demand on a network resource.

12. The computer-readable medium of claim 1, wherein:
    the first data structure further contains a representation of a plurality of network demands;

the second data structure further contains a representation of a plurality of network resources;

the third data structure further contains a representation of a plurality of resource bundles; and the fourth data structure further contains a representation of a plurality of resource bundle to demand links;

wherein the revenue management software program is operable to determine which of the plurality of resource bundles handle which of the plurality of demands in the network and to determine an optimal quantity of demands in the network to be satisfied by way of the plurality of resource bundles.

13. A system for representing and solving revenue management problems in a network, comprising:

a computer readable medium embodying a set of software instructions, wherein the software instructions are executable to:

construct and store on a tangible storage medium a generic revenue management data model such that the generic revenue management data model comprises:

a first data structure for storing a representation of one or more network demands for an item or a combination of items in the network, wherein the one or more network demands are actual or forecasted demands;

a second data structure for storing a representation of one or more network resources, wherein each network resource has at least one attribute for measuring an ability to contribute to a satisfaction of the one or more network demands;

a third data structure for storing a representation of one or more resource bundles, wherein each resource bundle represents a single resource or a group of resources residing in the second data structure and wherein the group of resources are combinable to form a product or service; and a fourth data structure for storing a representation of associations between the one or more resource bundles and the one or more network demands; wherein the first data structure is associated with the third data structure via the fourth data structure;

split problem information into revenue management problem data and optimization sequence data;

map the revenue management problems to the tangible storage medium according to the generic revenue management data model; and based on the optimization sequence data, perform at least one network optimization to derive an optimal network-wide solution for the network by applying one or more revenue management programs to the revenue management problem data stored in the first data structure, the second data structure, the third data structure, and the fourth data structure.

14. The system of claim 13, wherein the one or more network demands include:

at least one itinerary demand; and at least one fare class demand for one or more flights in an airline network.

15. The system of claim 13, wherein the software instructions are further executable to:

for each network resource, store a representation of a maximum capacity for the network resource;

store a representation of a physical capacity of the network resource; and store a representation of an expected use capacity of the network resource.

16. The system of claim 13, wherein the software instructions are further operable to:

store a representation of an optimal quantity in the fourth data structure; and store a representation of an optimal price in the fourth data structure.

17. The system of claim 13, wherein the software instructions are further operable to store a representation of a resource demand in a fifth data structure.

18. The system of claim 17, wherein the software instructions are further operable to generate the resource demand based on results of the network optimization.

19. A computer-implemented method for managing revenue in a network, comprising:

constructing a generic revenue management data model in a database or memory structure in the network, wherein the generic revenue management data model comprises a first data structure for storing a representation of a set of network demands, wherein the set of network demands are actual or forecasted demands for an item or a combination of items in the network;

a second data structure for storing a representation of a set of network resources, wherein each network resource has at least one attribute for measuring an ability to contribute to a satisfaction of a network demand;

a third data structure for storing a representation of a set of resource bundles, wherein each resource bundle represents a single resource or a group of resources residing in the second data structure and wherein the group of resources are combinable to form a product or service; and a fourth data structure for storing a representation of associations between the set of resource bundles represented in the third data structure and the set of network demands represented in the first data structure;

splitting problem information into revenue management problem data and optimization sequence data;

mapping the revenue management problem data to the database or the memory according to the generic revenue management data model; and based on the optimization sequence data, applying one or more revenue management programs to the revenue management problem data in the generic revenue management data model to derive an optimal network-wide solution for the network.

20. The computer-implemented method according to claim 19, wherein the generic revenue management data model allows data for multifarious revenue management problems in the network to be expressed in a uniform format.

21. The computer-implemented method according to claim 19, further comprising:

applying one or more revenue management programs to the revenue management problem data stored in the generic revenue management data model to derive an optimal network-wide solution for the network.

22. The computer-implemented method according to claim 19, further comprising:

decomposing the network to determine how the optimal network-wide solution affects individual local resources.

23. The computer-implemented method according to claim 22, wherein the generic revenue management data model further comprises a fifth data structure for storing a representation of demands placed on the individual local resources.

24. The computer-implemented method according to claim 22, further comprising:

applying at least one revenue management program to the revenue management problem data stored in the generic revenue management data model to derive one or more locally optimal solutions.

\* \* \* \* \*